United States Patent [19]

Parsons et al.

[11] Patent Number: 5,962,749
[45] Date of Patent: Oct. 5, 1999

[54] PROCESS FOR THE REMOVAL OF ALKALINITY IN THE MANUFACTURE OF POLYETHER POLYOLS AND THE REUSE OF THIS ALKALINITY IN THE MANUFACTURE OF POLYETHER POLYOLS

[75] Inventors: Harold R. Parsons, Wheeling; Donald C. Dunham, Paden City, both of W. Va.; Steven L. Schilling, Pittsburgh, Pa.; Keith J. Headley, Paden City, W. Va.

[73] Assignee: Bayer Corporation, Pittsburgh, Pa.

[21] Appl. No.: 08/998,150

[22] Filed: Dec. 24, 1997

[51] Int. Cl.$^6$ .......................... C07C 41/44; C07C 41/34
[52] U.S. Cl. .......................... 568/621; 210/702; 210/713; 210/729; 502/157; 502/171; 502/344; 568/618; 568/619; 568/622; 568/623; 568/624; 568/625; 568/854; 568/868; 568/869; 568/902; 568/913; 568/920; 568/921
[58] Field of Search .................. 568/618, 619, 568/621, 622, 623, 624, 625, 854, 868, 869, 902, 913, 920, 921; 502/157, 171, 344; 210/702, 713, 729

[56] References Cited

U.S. PATENT DOCUMENTS

| | | | |
|---|---|---|---|
| 4,137,396 | 1/1979 | Louvar et al. | 568/621 |
| 4,195,167 | 3/1980 | Kropf et al. | 568/618 |
| 4,396,780 | 8/1983 | Shtykh et al. | 568/623 |
| 4,430,490 | 2/1984 | Doerge | 528/77 |
| 4,507,475 | 3/1985 | Straehle et al. | 568/621 |
| 4,985,551 | 1/1991 | Perry et al. | 536/18.6 |
| 5,449,841 | 9/1995 | Goegebeur | 568/854 |

FOREIGN PATENT DOCUMENTS 2165140   6/1996   Canada .

*Primary Examiner*—Rabon Sergent
*Attorney, Agent, or Firm*—Joseph C. Gil; N. Denise Brown

[57] ABSTRACT

This invention relates to a process for the purification of polyether polyols. This process enables the removal of residual alkaline metal catalyst from produced polyether polyol. It comprises a) adding glycerine to a polyether polyol that contains Group IA alkaline metal catalyst to form a precipitate, and b) separating the precipitate formed in a) to provide a purified polyether polyol. The present invention also relates to the purified polyether polyol produced by this process, the precipitate produced by this process, and the use of the precipitate as an alkaline metal catalyst in a process for the production of polyether polyols.

9 Claims, No Drawings

PROCESS FOR THE REMOVAL OF ALKALINITY IN THE MANUFACTURE OF POLYETHER POLYOLS AND THE REUSE OF THIS ALKALINITY IN THE MANUFACTURE OF POLYETHER POLYOLS

BACKGROUND OF THE INVENTION

This invention relates to a process for the purification of a polyether polyol that was produced with an alkaline metal hydroxide catalyst. It also relates to the reuse of the recovered alkaline catalyst in the subsequent manufacture of polyether polyols. The polyether polyols produced by this process are also the subject of this invention.

Polyether polyols are manufactured commercially using the base catalyzed reaction of initiators having active hydrogen atoms with epoxides such as, for example, ethylene oxide and propylene oxide. Alkalinity is introduced into the polyether polyols, for example, by using metal hydroxides as catalysts. Virtually any strong base can be used as the catalyst for the manufacture of polyether polyols. Some examples of strong bases suitable for use as catalysts include metal alkoxides of low boiling alcohols (e.g., potassium methoxide, potassium ethoxide, etc.), or even the pure alkali metals (potassium or sodium metal). The use of these with a hydroxyl group containing initiator, ROH, is as shown in Equations I and II below.

$$CH_3O^-K^+ + ROH \rightarrow RO^-K^+ = CH_3OH\uparrow \quad (I)$$

$$K_{(metal)} + ROH \rightarrow RO^-K^+ + \tfrac{1}{2}H_2\uparrow \quad (II)$$

In equation (I), the methanol formed can be distilled off driving the reaction to the right.

Potassium hydroxide (KOH) and sodium hydroxide (NaOH) are some examples of typical alkaline catalysts used. In general, the metal hydroxide catalyst is added to the initiator (usually a hydroxyl group containing compound), and an equilibrium between the metal hydroxide and the initiator occurs. This equilibrium is as shown is Equation III below.

$$KOH + ROH = H_2O + RO^-K^+ \quad (III)$$

Both the hydroxide and the alkoxide can react with epoxides. This is often acceptable for short chain (low equivalent weight) polyols, but the reaction of water is undesirable in the preparation of long chain (i.e., high equivalent weight) polyols. It is therefore, necessary to force the above equilibrium to the right by removing the water (i.e., dewatering). This converts all of the hydroxide to alkoxide. The total amount of alkalinity remains constant and is equal to the amount of KOH originally added.

The alkalinity concentration is measured and reported as percent KOH. This percent KOH actually reflects the alkalinity which is present, even though this alkalinity is not necessarily KOH. Rather, it may actually be NaOH or another alkaline species such as an alkoxide.

Once the polymerization of the epoxide(s) is completed, the alkaline catalyst must be neutralized and/or removed from the crude mixture to yield the final polyether polyol. Several processes for the removal of the residual catalysts from the crude polyether polyols to yield the final product are known.

Known processes for removing the residual alkaline catalysts from polyether polyols are costly, time consuming and wasteful. One process for removing residual sodium or potassium hydroxide from polyether polyols comprises neutralizing the basic material (hydroxide or alkoxide) with aqueous sulfuric acid, distilling to remove water, and then filtering to remove the solid sodium or potassium sulfate salt which is formed by this process. This particular process results in additional costs related to the KOH and the sulfuric acid raw materials used and disposal of the filtercake which is formed. It also results in a loss of yield with respect to the polyether polyol as some polyether polyol inevitably remains in the filtercake unless additional steps are taken to recover it.

Another process for purifying polyether polyols is described in U.S. Pat. No. 5,449,841. This process specifically relates to reducing the level of metal ions and/or metal compounds of polyoxyalkylene monool and/or polyols having number average molecular weights of above 500 up to 25,000 by bringing these monools and/or polyols into contact with an extracting compound which is a polyol or polyol mixture having a number average molecular weight of at most 500, preferably at most 250, and mixing the extracting compound and the polyoxyalkylene monool or polyol. These extracting compounds must be immiscible with the polyoxyalkylene monool or polyol. The mixture of extracting compound and the polyoxyalkylene monool or polyol are allowed to separate, and the liquid extracting compound containing the alkaline catalyst is removed.

Glycerine is broadly disclosed as a polyol to be used as a suitable extracting compound in U.S. Pat. No. 5,449,841. The most preferred extracting compounds include, however, ethylene glycol, diethylene glycol and mixtures thereof. Diethylene glycol is used as the extracting compound in the only example. Diethylene glycol is not suitable for the presently claimed invention.

According to U.S. Pat. No. 5,449,841, the quantity of extracting compound preferred by the process therein is at least 25 parts extracting compound per 100 parts monool or polyol, and more preferably from 30 parts to 500 parts. This amount is, however, substantially higher than that required by the presently claimed invention. Furthermore, this reference clearly discloses that these liquid-liquid extractions form two separate layers upon standing at room temperature which can be separated. After separating these two layers, these polyols are then subjected to vacuum distillation at high temperature for long periods of time to remove any residual extracting compound. There is no information that suggests this process enables the reuse and/or recovery of the extracting compound or alkaline catalyst.

Other processes are also known in the art for removing alkaline catalysts from polyether polyols. Some examples include the use of ion exchange resins as described in, for example, U.S. Pat. No. 4,985,551; extraction with water as described in, for example, Canadian Patent Application 2,165,140; and the use of lactic acid as described in, for example, U.S. Pat. No. 4,430,490.

Accordingly, a need exists for a process by which most of the alkaline catalyst can be easily removed and, preferably be reused to prepare subsequent batches of polyether polyols. Such a process would assist in reducing costs associated with the manufacture of polyether polyols.

An object of the present invention was to provide a simple and efficient means of removing the alkaline catalyst from a polyether polyol to provide a substantially neutral product. A second object of the present invention was to provide a means to reuse the catalyst in subsequent batches of polyether polyols without undergoing elaborate concentration or purification steps.

In accordance with the present invention, the reaction of the present process is as shown in Equation (IV) below.

$$RO^-K^+ + glycerine \rightarrow ROH + \underline{glycerine^-K^+} \quad (IV)$$

In U.S. Pat. No. 5,449,841, the equilibrium is based on the relative acidities of the two alcohols. In the present invention, however, since the potassium glycerinate is a solid, it precipitates and is removed from the equilibrium, thereby forcing the reaction to completion. This is advantageous from a recycling point of view thus making the distillation step required by previous processes when using alkaline metal hydroxides or alkoxides no longer necessary.

SUMMARY OF THE INVENTION

This invention relates to a process for purifying a polyether polyol produced with an alkaline catalyst. This process comprises a) adding glycerine to a polyether polyol that contains alkaline catalyst residues, to form a precipitate, and b) separating, preferably filtering, the precipitate formed in a), to form a purified polyether polyol. This invention also relates to the purified polyether polyol produced by the above process, and to the precipitate recovered from this process.

Another aspect of this invention relates to a process for the manufacture of polyether polyols by alkoxylating at least one initiator compound in the presence of an alkaline catalyst, wherein the alkaline catalyst comprises the recovered precipitate from the above process. In this aspect of the invention, it is preferred that the polyether polyol be a glycerine initiated or glycerine co-initiated polyether polyol since glycerine and glycerine salts are present in the precipitate.

DETAILED DESCRIPTION OF THE INVENTION

In particular, the process of the invention comprises a) adding glycerine to a polyether polyol that contains alkaline catalyst residues at a temperature of from about 60 to about 190° C., preferably about 90 to 130° C., in an amount such that there are from 0.1 to 5, preferably 0.1 to 1.5 parts by weight of glycerine per 100 parts by weight of alkaline polyether polyol, and the molar ratio of glycerine to alkaline catalyst is from 0.5:1 to 1.5:1, preferably 1:1, thereby forming a precipitate. This is followed by b) separating, preferably filtering, the precipitate formed in a), thus resulting in a substantially purified polyether polyol. In general, the precipitate in step a) forms almost immediately, and can be separated after allowing sufficient time for thorough mixing.

The purified polyether polyols produced by this process exhibit only small changes in hydroxyl number in comparison to the crude polyether polyols that contain alkaline catalyst residues. This is both surprising and unexpected because even when excess glycerine is used (e.g., up to a glycerine:M(OH) molar ratio of about 1.5:1, preferably no more than about 1.25:1), the excess glycerine does not increase the OH number of the polyether polyol significantly, but is mostly removed with the precipitate.

After the precipitate is separated (e.g., filtered) in step b) of the present invention, this precipitate can be used as the alkaline catalyst in a process for the manufacture of polyether polyols. Accordingly, the process of the present invention enables the cost of both the catalyst and neutralizing agent required for manufacturing polyether polyols to be reduced significantly. In manufacturing polyether polyols, the starter compound containing one or more active hydrogen atoms is charged to a reactor along with recovered precipitate which functions as the catalyst for the reaction and supplies some glycerine as initiator. The epoxides are then charged and allowed to react, while maintaining the desired temperature and pressure, until the desired hydroxyl number is reached. Once the reaction is completed, glycerine is added to the alkaline polyether as described above to remove the alkalinity as a precipitate which can again be reused. This process reduces the amount of catalyst necessary for manufacturing polyether polyols, and eliminates the need for dewatering as previously discussed.

Suitable polyether polyols for purification by this process are those which contain alkaline metal catalyst(s) residues after their manufacture. These polyether polyols are characterized by a hydroxyl number of from about 25 to about 155, preferably from about 25 to about 60 (mg KOH/g); a molecular weight of from 360 to 9,000, preferably 1,900 to 6,700; and a nominal functionality of from 1 to 4, preferably 2 to 3. Such polyether polyols also contain from about 15% to about 100% by weight, preferably about 70% to about 100% by weight propylene oxide, and from 0% to about 85% by weight, preferably about 0% to about 30% by weight ethylene oxide, based on 100% by weight epoxide content, and being started from an initiator compound which is selected from the group consisting of butyl carbitol, ethylene glycol, propylene glycol, diethylene glycol, glycerine, trimethylol propane, pentaerythritol, monoethanolamine, diethanolamine, triethanolamine, ammonia and ethylene diamine. Preferred initiator compounds are selected from the group consisting of glycerine, propylene glycol, and trimethylol propane. Glycerine is the most preferred initiator as it allows for easy recycling of the catalyst.

Suitable methods for separating the precipitate formed in step a) of the above process include, for example, filtering, settling, centrifugation, or any other known means for separating a solid from a liquid phase. In each case, the separated precipitate can be used as an alkaline catalyst in producing batches of polyether polyols.

Suitable alkaline catalysts for the process of the invention include Group IA alkaline metals, and hydroxides or alkoxides thereof. Some examples of suitable catalysts include compounds such as potassium metal, sodium metal, potassium hydroxide, sodium hydroxide, cesium hydroxide, lithium hydroxide, sodium methoxide, potassium ethoxide, etc. Preferred catalysts for the present invention are the alkaline metal hydroxide catalysts, and more preferably potassium hydroxide and sodium hydroxide. Potassium hydroxide is the most preferred alkaline catalyst for the present invention.

As described above, the recovered precipitate may be used to catalyze a subsequent batch of polyether polyol. It is preferred that such polyether polyols are initiated or co-initiated with glycerine since the precipitate contains glycerine and/or glycerine salts. In a process analogous to co-starting a polyether polyol with glycerine and glycerine initiated polyol and KOH, polyether polyols can be produced by co-starting with the potassium glycerinate precipitate and a glycerine initiated polyether polyol, preferably a polyether polyol having a hydroxyl number of from about 250 to about 1,000. The glycerine-initiated polyol is necessary to provide sufficient liquid volume and to make the starting mixture stirrable. A suitable quantity of the glycerine initiated polyether polyol having a hydroxyl number of from about 250 to about 1,000 is charged to a reactor along with a suitable quantity of precipitate. In some cases, additional fresh catalyst, e.g., KOH, may be required. In general, however, the polyol can be catalyzed using only the recovered precipitate. The alkylene oxides are then added and allowed to react, to provide a polyether polyol of the desired hydroxyl number. These alkylene oxides may be added either simultaneously or sequentially to one another. After the reaction is complete, the catalyst is removed either by a conventional process or preferably by the process of the present invention as described above.

As used herein, the term MOH refers to metal hydroxide, wherein M represents a Group IA alkaline metal.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Polyol 1 was prepared according to the following general procedure:

The active hydrogen containing starter, specifically trimethylol propane, was charged to a reactor along with an amount of 46% KOH to give a concentration of about 0.3% KOH, based on the final amount of polyol to be prepared. The water was removed by distillation to >100° C. and <10 mm Hg. The required amount of propylene oxide was added over time so as to maintain a vapor pressure of ≦30 psig and a temperature between 90 and 130° C. After allowing sufficient time for the propylene oxide to react completely, the potassium alkoxide containing polyol was treated with glycerine as set forth in the tables below.

Polyols 2–19 were prepared according to the following general procedure:

The active hydrogen containing starters were charged to a reactor along with an amount of 46% KOH to give a concentration of about 0.3 to 0.6% KOH, based on the final amount of polyol to be prepared. The water was removed by distillation to >100° C. and <10 mm Hg. The required amounts and type of epoxide were added over time so as to maintain an epoxide vapor pressure of ≦30 psig and a temperature between 90 and 130° C. After allowing sufficient time for the epoxides to react completely, a sufficient quantity of $H_2SO_4$ to neutralize the alkaline catalyst was added. The water was removed by vacuum distillation and the potassium sulfate salts removed by filtration to give the finished neutral polyol.

Alkaline polyols were prepared from these neutralized polyols by adding the designated catalysts to these neutralized polyols at 70° C., then heating to 110° C. and holding for one hour. To remove water, the samples were stripped at 110° C. using 1 hour to ramp the vacuum down to less than 5 mm Hg and maintaining the conditions for 1 hour. The alkalinity of each alkaline polyol was measured and is reported in Tables 1A, 1B and 1C along with the hydroxyl number of each polyol.

In accordance with the process of the present invention, the resultant alkaline polyols 1–19 were purified by adding glycerine (at ambient room temperature) to each polyol and stirring for 1 hour. The amount of glycerine added was based on the measured alkalinity of the sample (alkalinity as %KOH). The amount of glycerine and the conditions under which it was added are shown in Tables 2A and 2B. The samples were then filtered and the collected polyol was analyzed for hydroxyl number and alkalinity as shown in Tables 3A and 3B below.

TABLE 1A

Preparation of Polyether Polyols 1–8

| Polyols | Initiator | Functionality of Initiator | Initial OH#, mg KOH/g | Epoxide Sequence | Wt. Ratio of Epoxides | Alkaline Catalyst Used | Initial Alkalinity in Polyol (as % KOH) |
|---|---|---|---|---|---|---|---|
| Polyol 1 | trimethylol propane | 3 | 35.7 | PO | 100 | KOH | 0.315 |
| Polyol 2 | glycerine | 3 | 1050 | PO | 100 | KOH | 0.434 |
| Polyol 3 | glycerine | 3 | 470 | PO | 100 | KOH | 0.422 |
| Polyol 4 | glycerine | 3 | 250 | PO | 100 | KOH | 0.437 |
| Polyol 5 | glycerine | 3 | 112.5 | PO | 100 | KOH | 0.342 |
| Polyol 6 | glycerine | 3 | 53.5 | PO | 100 | KOH | 0.408 |
| Polyol 7 | butyl carbitol | 1 | 26.0 | EO, PO | 65, 35 | KOH | 0.427 |
| Polyol 8 | propylene glycol | 2 | 31.4 | PO, EO | 80, 20 | KOH | 0.468 |

TABLE 1B

Preparation of Polyether Polyols 9–15

| Polyols | Initiator | Functionality of Initiator | Initial OH#, mg KOH/g | Epoxide Sequence | Wt. Ratio of Epoxides | Alkaline Catalyst Used | Initial Alkalinity in Polyol (as % KOH) |
|---|---|---|---|---|---|---|---|
| Polyol 9 | triethanolamine | 3 | 152 | PO | 100 | KOH | 0.340 |
| Polyol 10 | trimethylol propane | 3 | 370 | PO | 100 | KOH | 0.427 |
| Polyol 11 | ethylene diamine | 4 | 60.6 | PO | 100 | KOH | 0.334 |

TABLE 1B-continued

Preparation of Polyether Polyols 9–15

| Polyols | Initiator | Functionality of Initiator | Initial OH#, mg KOH/g | Epoxide Sequence | Wt. Ratio of Epoxides | Alkaline Catalyst Used | Initial Alkalinity in Polyol (as % KOH) |
|---|---|---|---|---|---|---|---|
| Polyol 12 | ethylene diamine | 4 | 450 | PO | 100 | KOH | 0.386 |
| Polyol 13 | m-toluene diamine | 4 | 460 | EO, PO | 43, 57 | KOH | 0.433 |
| Polyol 14 | sorbitol | 6 | 100 | PO, EO | 18, 82 | KOH | 0.438 |
| Polyol 15 | sucrose/ propylene glycol | 6.2 | 340 | PO | 100 | KOH | 0.398 |

TABLE 1C

Preparation of Polyether Polyols 16–19

| Polyols | Initiator | Functionality of Initiator | Initial OH#, mg KOH/g | Epoxide Sequence | Wt. Ratio of Epoxides | Alkaline Catalyst Used | Initial Alkalinity in Polyol (as % KOH) |
|---|---|---|---|---|---|---|---|
| Polyol 16 | glycerine | 3 | 12.9 | PO, EO | 87, 13 | KOH | 2.721 |
| Polyol 17 | glycerine | 3 | 28.9 | PO, EO | 87, 13 | KOH | 0.056 |
| Polyol 18 | glycerine | 3 | 28.9 | PO, EO | 87, 13 | NaOH | 0.392 |
| Polyol 19 | glycerine | 3 | 28.9 | PO, EO | 87, 13 | CsOH | 0.409 |

TABLE 2A

Glycerine Addition Parameters for Polyether Polyols 1–10

| Polyol | Alkaline Polyol (gms) | Initial Alkalinity in Polyol (% KOH) | Glycerine (gms) | Temp. of Polyol and Run Temp. (° C.) | Glycerine Addition Time (min) |
|---|---|---|---|---|---|
| 1 | 300 | 0.315 | 1.55 | 110 | 15 |
| 2 | 301 | 0.434 | 2.16 | 110 | 15 |
| 3 | 295 | 0.422 | 2.05 | 110 | 15 |
| 4 | 296 | 0.437 | 2.12 | 110 | 15 |
| 5 | 146 | 0.342 | 0.82 | 110 | 15 |
| 6 | 296 | 0.408 | 1.98 | 110 | 15 |
| 7 | 294 | 0.427 | 2.06 | 110 | 15 |
| 8 | 300 | 0.468 | 2.31 | 90 | <1 |
| 9 | 297 | 0.340 | 1.66 | 110 | 60 |
| 10 | 300 | 0.427 | 2.07 | 110 | 15 |

TABLE 2B

Glycerine Addition Parameters for Polyether Polyols 11–19

| Polyol | Alkaline Polyol (gms) | Initial Alkalinity in Polyol (% KOH) | Glycerine (gms) | Temp. of Polyol and Run Temp. (° C.) | Glycerine Addition Time (min) |
|---|---|---|---|---|---|
| 11 | 295 | 0.334 | 1.62 | 110 | 15 |
| 12 | 295 | 0.386 | 1.87 | 110 | 15 |
| 13 | 689 | 0.433 | 4.89 | 110 | 15 |
| 14 | 296 | 0.438 | 2.12 | 110 | 15 |
| 15 | 294 | 0.398 | 1.92 | 110 | 15 |
| 16 | 286 | 2.721 | 12.80 | 110 | 15 |
| 17 | 295 | 0.056 | 0.27 | 110 | 15 |
| 18 | 295 | 0.392 | 1.90 | 110 | 15 |
| 19 | 295 | 0.409 | 1.98 | 110 | 15 |

TABLE 3A

Results of Glycerine Addition to Polyether Polyols 1–8

| Polyols | Initial OH#, mg KOH/g | Initial % Alkaline Catalyst | Precipitate Obtained? | Final % Alkaline Catalyst | % Catalyst Removed | Final OH#, mg KOH/g | OH# Difference, mg KOH/g |
|---|---|---|---|---|---|---|---|
| Polyol 1 | 35.7 | 0.315 | Yes | 0.007 | 97.8% | 33.7 | −2.0 |
| Polyol 2 | 1050 | 0.434 | No | — | — | — | — |
| Polyol 3 | 470 | 0.422 | No | — | — | — | — |
| Polyol 4 | 250 | 0.437 | No | — | — | — | — |
| Polyol 5 | 112.5 | 0.342 | Yes | 0.017 | 95.0% | 114.2 | +1.7 |
| Polyol 6 | 53.5 | 0.408 | Yes | 0.022 | 94.6% | 54.5 | +1.1 |
| Polyol 7 | 26.0 | 0.427 | Yes | 0.048 | 88.8% | 26.3 | +0.3 |
| Polyol 8 | 31.4 | 0.468 | Yes | 0.001 | 99.8% | 32.8 | +1.4 |

TABLE 3B

Results of Glycerine Addition to Polyether Polyols 9–15

| Polyols | Initial OH#, mg KOH/g | Initial % Alkaline Catalyst | Precipitate Obtained? | Final % Alkaline Catalyst | % Catalyst Removed | Final OH#, mg KOH/g | OH# Difference, mg KOH/g |
|---|---|---|---|---|---|---|---|
| Polyol 9 | 152 | 0.340 | Yes | 0.026 | 92.4% | 159 | +7 |
| Polyol 10 | 370 | 0.427 | No | — | — | — | — |
| Polyol 11 | 60.6 | 0.334 | Yes | 0.001 | 99.7% | 61.6 | +1.0 |
| Polyol 12 | 450 | 0.386 | No | — | — | — | — |
| Polyol 13 | 460 | 0.433 | No | — | — | — | — |
| Polyol 14 | 100 | 0.438 | No | — | — | — | — |
| Polyol 15 | 340 | 0.398 | No | — | — | — | — |

TABLE 3C

Results of Glycerine Addition to Polyether Polyols 16–19

| Polyols | Initial OH#, mg KOH/g | Initial % Alkaline Catalyst | Precipitate Obtained? | Final % Alkaline Catalyst | % Catalyst Removed | Final OH#, mg KOH/g | OH# Difference, mg KOH/g |
|---|---|---|---|---|---|---|---|
| Polyol 16 | 28.9 | 2.721 | Yes | 0.098 | 96.4% | 30.1 | +1.3 |
| Polyol 17 | 28.9 | 0.056 | No | 0.059 | 0% | — | — |
| Polyol 18 | 28.9 | 0.392 | Yes | 0.015 | 96.2% | 29.3 | +0.4 |
| Polyol 19 | 28.9 | 0.409 | Yes | 0.218 | 46.7% | 33.0 | +4.2 |

To determine the effect of glycerine:KOH ratio on KOH removal, a series of experiments was run to examine this factor. These experiments were run using Polyol A in accordance with the following procedure.

Polyol A: a glycerine initiated propylene oxide/ethylene oxide (87:13 wt. ratio) polyether polyol with an OH number of 29.4 mg KOH/g and an alkalinity of 0.377% KOH.

Examples 1–5

In TABLE 4 below are experiments to show the effect of the glycerine:KOH molar ratio. Except when noted, the glycerine was added dropwise over 15 minutes with the alkaline polyether polyol at 100° C. (Example 5 was run at 90° C.) The samples were then stirred for one hour before filtering. The results show that a glycerine:KOH molar ratio of 1.0 is optimal. KOH removal efficiency decreases when less than one mole of glycerine per equivalent of KOH is used while the hydroxyl number of the treated polyol increases slightly when more than one mole is used, but not as much one would predict, based on the excess of glycerine added, assuming the precipitate is as a 1:1 complex of K⁺ with glycerine⁻.

TABLE 4

Effect of Glycerine:KOH ratios on KOH Removal

| Example | Glycerine: KOH Molar Ratio | % KOH of Filtered Polyol | % KOH Removal | OH# of Filtered Polyol, mg KOH/g | Change in OH#, mg KOH/g |
|---|---|---|---|---|---|
| 1 | 0.50 | 0.130 | 65.5 | 29.4 | 0.0 |
| 2 | 0.75 | 0.094 | 75.1 | 29.5 | +0.1 |
| 3 | 1.00 | 0.004 | 98.9 | 29.4 | 0.0 |
| 4 | 1.25 | 0.004 | 98.9 | 30.3 | +0.9 |
| 5 | 1.50 | 0.010 | 97.3 | 30.8 | +1.4 |

Example 6

A polyether polyol was prepared using glycerine as an initiator, reacting with 87% of propylene oxide, followed by 13% of ethylene oxide as described previously. This polyether polyol had an OH number of about 30.5 mg KOH/g and an alkalinity of about 0.48% KOH.

One mole of glycerine per equivalent of alkalinity was added to the reactor containing this alkaline polyether polyol, and the material was stirred for 1 hour at 110° C. The material was cooled to 90° C. and filtered. Both the filtrate and the precipitate were collected and analyzed. The results are shown in TABLE 5 below.

TABLE 5

| Method | Starting Material | Filtrate | Precipitate* |
| --- | --- | --- | --- |
| OH#, mg KOH/g | 30.5 | 30.3 | — |
| Alkalinity as % KOH | 0.48 | 0.003 | 24.0 |

Analysis of the precipitate showed it contained about 26.8% glycerine and about 15.3% potassium.

Over 99% of the alkalinity was removed from the polyether polyol with no significant change in the hydroxyl number of the product. These results also demonstrate that nearly all of the alkalinity and added glycerine end up in the solid filterable precipitate.

Example 7

This example demonstrates the reuse of recovered filter-cake from Example 6 to catalyze a subsequent batch of polyether polyol.

A polyether polyol was produced by co-starting with the potassium glycerinate precipitate of Example 6 and Polyether Polyol B (glycerine initiated, propoxylated to an OH number of about 250). This was necessary to provide sufficient liquid volume and to make the starting mixture stirrable.

503.7 g of Polyether Polyol B was charged to a five-gallon reactor along with 140.6 g. of filter cake collected from Example 6. 11192 g. of propylene oxide was then added and allowed to react, followed by the addition of 1700 g. of ethylene oxide. After the ethylene oxide was reacted, the batch was neutralized with sulfuric acid, dewatered at 110° C. to less than 5 mm Hg, and filtered. The finished product (i.e., Polyether Polyol C) was analyzed and the results are set forth in TABLE 6 below.

TABLE 6

| Analysis | Polyether Polyol C of Example 7 |
| --- | --- |
| OH number, mg KOH/g | 31.7 |
| Acid Number, mg KOH/g | 0.013 |
| water content (%) | 0.022 |
| APHA Color | 40 |
| pH (9/1 MeOH/water) | 8.4 |
| Viscosity at 25° C, mpa.s | 943 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for purifying a polyether monool and/or a polyether polyol produced with a Group IA alkaline metal catalyst, comprising:

a) adding glycerine to a polyether monool and/or a polyether polyol that contains Group IA alkaline metal catalyst at a temperature of from about 60 to about 190° C. in an amount such that there are from about 0.1 to about 5 parts by weight of glycerine per 100 parts by weight of polyether monool and/or polyether polyol, and the molar ratio of glycerine to Group IA alkaline metal catalyst is from about 0.5:1 to about 1.5:1, to form a precipitate, wherein said polyether monool and/or polyether polyol has a hydroxyl number of from about 25 to about 155, a molecular weight of from about 360 to about 9,000, a functionality of from about 1 to 4, and contains from about 15% to 100% by weight propylene oxide (based on 100% by weight of total epoxide content) and from about 0% to about 85% by weight of ethylene oxide (based on 100% by weight of total epoxide content), and said polyether monool and/or polyether polyol being started from an initiator selected from the group consisting of: butyl carbitol, ethylene glycol, propylene glycol, diethylene glycol, glycerine, trimethylol propane, pentaerythritol, monoethanolamine, diethanolamine, triethanolamine, ethylene diamine, ammonia, and mixtures thereof;

and b) separating said precipitate formed in a), thereby leaving a purified polyether monool and/or polyether polyol.

2. The process of claim 1, wherein said glycerine is added to the polyether monool and/or polyether polyol containing Group IA alkaline metal catalyst in an amount such that there are from about 0.1 to about 1.5 parts by weight of glycerine per 100 parts by weight of polyether monool and/or polyether polyol.

3. The process of claim 1, wherein said glycerine is added to the polyether monool and/or polyether polyol containing Group IA alkaline metal catalyst in an amount such that the molar ratio of glycerine to Group IA alkaline metal catalyst is about 1:1.

4. The process of claim 1, wherein said glycerine is added to the polyether monool and/or polyether polyol containing Group IA alkaline metal catalyst at a temperature of from about 90 to 130° C.

5. The process of claim 1, wherein said polyether polyol has a hydroxyl number of from about 25 to about 60, a molecular weight of from about 1,900 to about 6,700, a functionality of from about 2 to about 3, and contains from about 70% to 100% by weight propylene oxide (based on 100% by weight of total epoxide content) and from 0% to about 30% by weight of ethylene oxide (based on 100% by weight of total epoxide content), and said polyether polyol is started from an initiator selected from the group consisting of: propylene glycol, glycerine, trimethylol propane and mixtures thereof.

6. The process of claim 5, wherein said initiator is glycerine.

7. The process of claim 1, wherein said Group IA alkaline metal catalyst is an alkaline metal hydroxide catalyst.

8. The process of claim 7, wherein said alkaline metal hydroxide catalyst is potassium hydroxide.

9. The process of claim 1, wherein b) separating said precipitate is by filtering or centrifuging.

* * * * *